US011631117B2

United States Patent
Schroepfer et al.

(10) Patent No.: US 11,631,117 B2
(45) Date of Patent: Apr. 18, 2023

(54) METHOD, SYSTEM, AND NON-TRANSITORY COMPUTER READABLE STORAGE DEVICE FOR A POOLING REQUIREMENT WHILE PRESERVING PRIVACY

(71) Applicant: SAP SE, Walldorf (DE)

(72) Inventors: Axel Schroepfer, Borthen (DE); Kilian Becher, Dresden (DE); Marcel Muth, Dresden (DE); Mirko Schaefer, Dresden (DE)

(73) Assignee: SAP SE, Walldorf (DE)

( * ) Notice: Subject to any disclaimer, the term of this patent is extended or adjusted under 35 U.S.C. 154(b) by 130 days.

(21) Appl. No.: 16/409,394

(22) Filed: May 10, 2019

(65) Prior Publication Data

US 2020/0357031 A1    Nov. 12, 2020

(51) Int. Cl.
*G06Q 30/00* (2012.01)
*G06Q 30/0601* (2023.01)
*H04L 67/02* (2022.01)
*H04L 9/00* (2022.01)
*H04L 9/08* (2006.01)

(52) U.S. Cl.
CPC ..... *G06Q 30/0605* (2013.01); *G06Q 30/0615* (2013.01); *H04L 9/008* (2013.01); *H04L 9/0822* (2013.01); *H04L 67/02* (2013.01)

(58) Field of Classification Search
CPC   G06Q 30/0605; G06Q 30/0615; H04L 9/008; H04L 9/0822; H04L 67/02
USPC ...................................................... 705/26.2
See application file for complete search history.

(56) References Cited

U.S. PATENT DOCUMENTS

| | | | |
|---|---|---|---|
| 2008/0114681 A1* | 5/2008 | Staddon ................ | G06Q 30/06 705/50 |
| 2008/0114682 A1* | 5/2008 | Staddon ................ | G06Q 30/06 705/50 |
| 2013/0024259 A1* | 1/2013 | Wolf ...................... | G06Q 30/02 705/14.23 |

(Continued)

OTHER PUBLICATIONS

Domingo-Ferrer, J., Blanco-Justicia, A., & Ràfols, C. (2018). Dynamic group size accreditation and group discounts preserving anonymity. International Journal of Information Security, 17(3), 243-260. doi:https://doi.org/10.1007/s10207-017-0368-y (Year: 2018).*

(Continued)

*Primary Examiner* — Marissa Thein
*Assistant Examiner* — Arielle E Weiner
(74) *Attorney, Agent, or Firm* — Sterne, Kessler, Goldstein & Fox P.L.L.C.

(57) ABSTRACT

Disclosed herein are system, method, and computer program product embodiments for pooling requirements, such as placing of multiple purchase orders, while preserving the privacy of the requirements provided by requesters placing the orders. The approach involves receiving first encrypted information comprising a first request from a first client and second encrypted information comprising a second request from a second client. An encrypted intersection result of the first request and the second request can then be calculated using the first encrypted information and the second encrypted information, in their encrypted form without the need to decrypt either.

18 Claims, 6 Drawing Sheets

(56) References Cited

U.S. PATENT DOCUMENTS

| | | | | |
|---|---|---|---|---|
| 2013/0046598 | A1* | 2/2013 | Roberts | G06Q 30/0605 705/14.23 |
| 2013/0311315 | A1* | 11/2013 | Zises | G06Q 30/0605 705/26.2 |
| 2014/0236748 | A1* | 8/2014 | Haran | G06Q 30/0605 705/26.2 |
| 2014/0258027 | A1* | 9/2014 | Veugen | H04L 63/0428 705/26.7 |
| 2015/0149427 | A1* | 5/2015 | Kerschbaum | G06F 16/951 707/706 |
| 2016/0078431 | A1* | 3/2016 | Ramachandran | G06Q 30/0605 705/64 |
| 2016/0104189 | A1* | 4/2016 | Marcus | G06Q 30/0283 705/14.34 |
| 2016/0148244 | A1* | 5/2016 | Nordstrand | G06Q 20/208 705/14.38 |
| 2017/0041132 | A1* | 2/2017 | Nicholls | H04L 9/0825 |
| 2017/0293913 | A1* | 10/2017 | Gulak | H04L 9/008 |
| 2017/0344971 | A1* | 11/2017 | Kargman | G06Q 50/12 |
| 2018/0089707 | A1* | 3/2018 | Sills | G06Q 10/067 |
| 2018/0276417 | A1* | 9/2018 | Cerezo Sanchez | G06F 21/74 |
| 2019/0147416 | A1* | 5/2019 | Rule | G06Q 20/3223 705/39 |
| 2019/0155956 | A1* | 5/2019 | Kesarwani | H04L 9/14 |
| 2019/0220945 | A1* | 7/2019 | Jung | G06Q 30/0236 |
| 2020/0327252 | A1* | 10/2020 | McFall | G06F 21/78 |

OTHER PUBLICATIONS

Becher, K., "Privacy-preserving key figure comparison using Secure Multi-Party Computation," Technische Universitat Dresden Master's Thesis, Nov. 9, 2017, pp. I-XVI and 1-120.

Becher, K. et al., U.S. Appl. No. 16/036,288, entitled "Private Benchmarking Cloud Service with Enhanced Statistics," filed Jul. 16, 2018.

Becher, K. et al., U.S. Patent Appl. No. to be assigned, entitled "Privacy-Preserving Benchmarking with Interval Statistics Reducing Leakage," filed concurrently herewith.

Brakerski, Z. et al., "Fully Homomorphic Encryption without Bootstrapping," Electronic Colloquium on Computational Complexity, Report No. 111, 2011, pp. 1-26.

Cloud Foundry—Open Source Cloud Application Platform [online]. 2019 [retrieved on May 3, 2019], retrieved from the Internet:<https://www.cloudfoundry.org>, 10 pages.

Cramer, R. et al., Secure Multiparty Computation and Secret Sharing, Cambridge University Press, ISBN 978-1-107-04305-3, Copyright 2015, pp. 3-13.

Fan, J. et al., "Somewhat Practical Fully Homomorphic Encryption," IACR Cryptology ePrint Archive, 2012, 19 pages.

Gentry, C., "Fully Homomorphic Encryption Using Ideal Lattices," STOC 2009, pp. 169-178.

Gentry, C. et al., "Homomorphic Encryption from Learning with Errors: Conceptually-Simpler, Asymptotically-Faster, Attribute-Based," CRYPTO(1), Jun. 8, 2013, 25 pages.

Goldreich, O. et al., "How to Play Any Mental Game or A Completeness Theorem for Protocols with Honest Majority," Proc. of the 19th Annual ACM Symp. on Theory of Computing, 1987, pp. 218-229.

Hirt, M., "Multi-Party Computation: Efficient Protocols, General Adversaries, and Voting," ETH Zurich Dissertation, 2001, 174 pages.

Katz, J. et al., Introduction to Modern Cryptography, Chapman & Hall/CRC, ISBN 978-1-58488-551-1, 2008, pp. 333-346 and 408-417.

Kerschbaum, F., "Practical Privacy-Preserving Benchmarking," Proc. of the IFIP TC 11 23rd Int'l Information Security Conference, 2008, pp. 17-31.

Kerschbaum, F., "A Privacy-Preserving Benchmarking Platform," Karlsruhe Institute of Technology Dissertation, Jun. 16, 2010, pp. i-xii and 1-145.

Mukherjee, P. et al., "Two Round Multiparty Computation via Multi-Key FHE," Eurocrypt Feb. 27, 2016, pp. 1-32.

* cited by examiner

METHOD, SYSTEM, AND NON-TRANSITORY COMPUTER READABLE STORAGE DEVICE FOR A POOLING REQUIREMENT WHILE PRESERVING PRIVACY

BACKGROUND

The internet has simplified request and fulfillment of orders of all kinds of goods and services. This includes fulfillment of bulk orders, for which a supplier often provides some form of discount depending on a quantity of requested items.

In situations where bulk discounts are offered for purchasing a certain quantity of items, a purchaser may save money by combining their order with another purchaser. However, for various practical reasons, this is not regularly done.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for pooling requirements from multiple sources while preserving the privacy of these sources.

One basic concept of bulk purchasing is the availability of tiered pricing. In tiered pricing, a seller offers buyers a better price per item as a total quantity of items to purchase increases. For example, a seller may offer a full retail price of X per item for orders of 1-100 items, a slightly discounted price X' per item for orders of 101-200 items, and a significantly discounted price of X" per item for orders of 201 or more. A buyer able to make a larger purchase therefore receives the most favorable price.

Large companies, such as large retailers like Amazon and Walmart, effectively leverage this purchasing power by accumulating what would have been many individual retail locations under the umbrella of a single purchasing authority. However, smaller companies will end up paying full freight.

One skilled in the relevant arts will recognize that while the discussion here is presented in the context of improving purchasing power by buyers purchasing from sellers, general pooling of specific requirements can be beneficial in other contexts, which are applicable here. For example, manufacturing specialized parts may not be practical unless done in bulk, and it may be difficult to coordinate sufficient requests simultaneously. However, if requesters (e.g., buyers) are able to pool together to meet a minimum threshold for provision of the specialized parts by a manufacturer (e.g., seller), then it is more likely that this minimum will be met.

In a non-limiting example, Company A is a car seat producer, and Company B is a pump producer. Both companies determine that they have a need for ISO 4017 hexagon screws. Company A has performed its research, and wishes to order 20,000 units of ISO 4017 hexagon screws from Screwmaster Ltd. based on its needs for quality, delivery time, and price. Company B has likewise performed its research, and wishes to order 30,000 units of ISO 4017 hexagon screws from Screwmaster Ltd. based on its own needs for quality, delivery time, and price.

Screwmaster Ltd. offers this item, the ISO 4017 hexagon screw, with a tiered pricing model: $0.10/pc (0-10,000 pieces per order); $0.08 (10,001-40,000 pieces per order); and $0.05 (40,001+pieces per order). According to this tiered pricing model, Company A would pay (20,000*$0.08)=$1,600 for its order. Company B would pay (30,000*$0.08)=$2,400 for its order. However, if Company A and B would pool their order together, the total cost would be (50,000*$0.05)=$2,500. Company A would pay only (20,000*0.05)=$1,000, and Company B would pay only (30,000*0.05)=$1,500.

Given the desirability of pooling orders in this way, it would be natural for such approaches to be commonplace. Yet they are not. One core reason for this is that requesters are not willing to openly share information about their requests with other requesters. Specifically, if a first requester (buyer A) and a second requester (buyer B) wish to purchase a same item, and pooling their purchases together would result in efficiencies, buyer A would need to share with buyer B the item they wish to purchase, the quantity they wish to purchase, and that they use a particular supplier, for example. And buyer B would need to share the same information with buyer A.

This information sharing is problematic, especially if buyer A and buyer B are competitors. Determining a supplier that can deliver the requested item, particularly under specific quality, delivery time, and price constraints, is often a form of trade secret that represents a business advantage. Therefore, despite the efficiencies that could be realized by pooling orders, the confidentiality concerns preclude this from happening.

In accordance with an embodiment, an approach is provided that allows requesters, such as buyer A and buyer B, to pool their requests together without losing this business advantage. More specifically, buyer A may present their purchase request in an encrypted manner, and buyer B may present their purchase request in an encrypted manner, while an intermediary can pool the purchase requests together without needing to decrypt the individual purchase requests. This approach therefore preserves confidentiality for buyer A and buyer B because their confidential information remains encrypted throughout the process.

Figure 1:
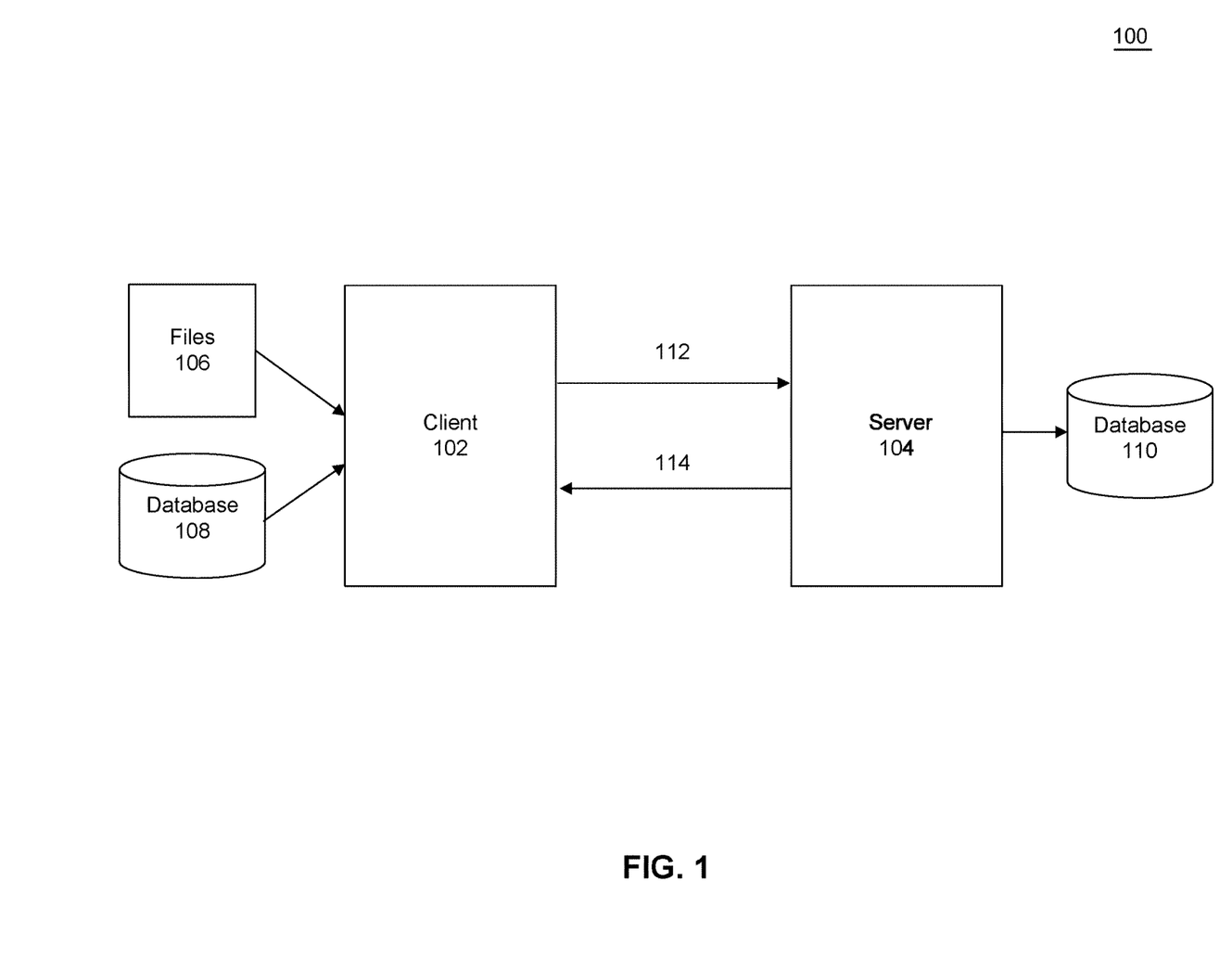
FIG. 1 illustrates a system for gathering and resolving pooled requests, in accordance with an embodiment.

FIG. 1 illustrates a system 100 for gathering and resolving pooled requests, in accordance with an embodiment. In the embodiment, a client 102 is connected to a server 104. Client 102 gathers up requests for pooling from its sources, such as files 106 and database 108, in accordance with an embodiment. One skilled in the relevant arts will appreciate that multiple clients 102 may be present and usable to gather requests. In an embodiment, client 102 is (or is coupled to) a multi-tenant system, and the requests are sourced from individual tenants (e.g., where both buyer A and buyer B in the previous example are tenants of a same multi-tenant system).

Server 104 is configured to perform the pooling, and determine a total quantity being ordered of a given item. In a purchasing context, server 104 can determine a particular price based on publicly available tiering prices, and inform the client 102 (and individual requesters) of the potential savings. As shown in FIG. 1, the request information sent from client 102 to server 104 is provided encrypted in communication 112 in accordance with an embodiment. And the resulting information from server 104 is provided to client 102 encrypted in communication 114, in accordance with an embodiment. By way of non-limiting example, encrypted communications 112 and 114 may be provided using HTTPS connections.

One skilled in the relevant arts will appreciate that although system 100 is shown as a client/service architecture, other structures that securely gather information from individual requesters and provide for pooling this information while in encrypted form, are contemplated within the scope of this disclosure.

In order for the information of buyer A obtained by client 102 to be kept secret from buyer B, and vice versa, the information of each participating requester must be encrypted. This encrypted information could be transmitted to server 104, where server 104 decrypts the information, determines the quantities of like items (e.g., materials, vendors, and auxiliary attributes), and figures the unit price per item based on the overall quantity. This could be configured by providing a shared key or a public key to server 104 in order to send the encrypted data (encrypted by the shared key or by a private key) and allow server 104 to decrypt the data.

However, requiring server 104 to decrypt the information in order to perform its computations is risky. The highly sensitive information sent by requesters could be obtained in plain text by anyone with access to server 104. This requires a high degree of trust in server 104, and the participating requesters are not able to audit server 104 effectively since it contains information about competitors.

In an embodiment, server 104 performs its calculations entirely without the need to decrypt the request information it receives. One skilled in the relevant arts will appreciate that in modern cryptographic applications, there are various encryption schemes that allow for computations to be performed on top of ciphertexts. More precisely, an operation on two ciphertexts yields the encrypted result of a corresponding (i.e., homomorphic) operation performed on the underlying plaintext information.

The use of homomorphic encryption schemes allows a party, such as server 104, to perform desired computations without the need to decrypt received ciphertext information. The result is encrypted as well, and remains encrypted until it is decrypted by the owner of the corresponding decryption key—usually the requester who owns the input request information. As a result, private information (such as the item to purchase, the quantity to purchase, and a supplier) provided by buyer A and buyer B to remain encrypted throughout the process, so that the private information is not revealed to any parties.

Figure 2:
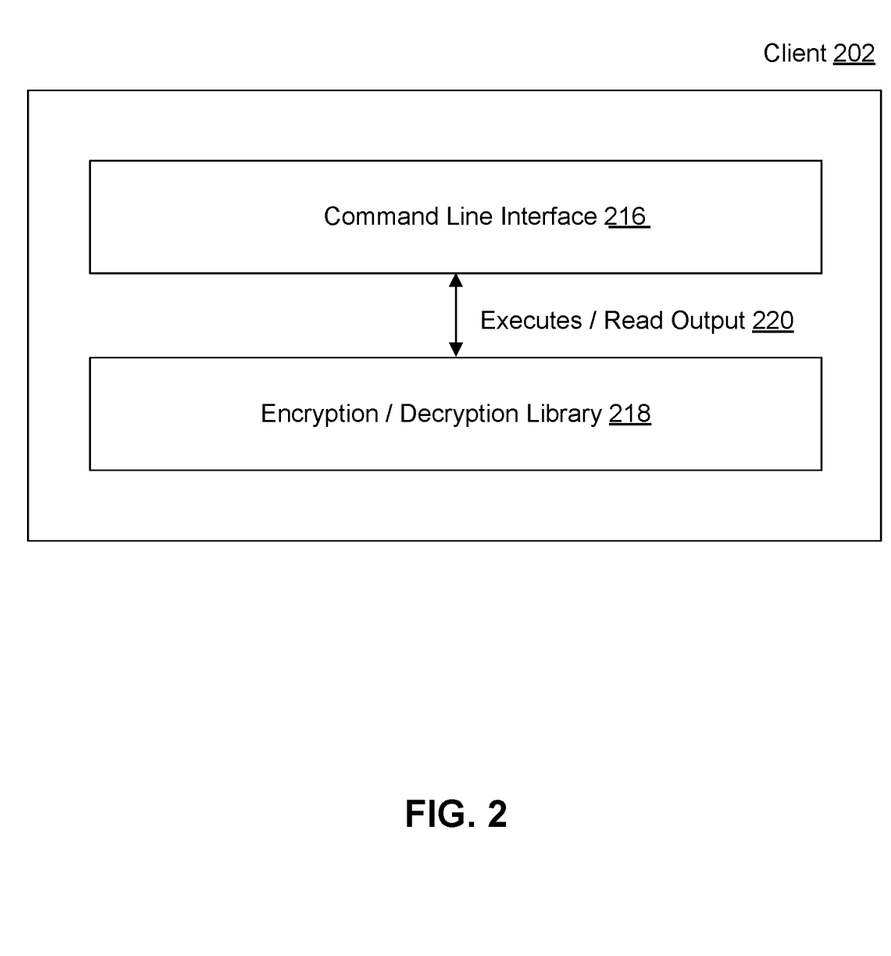
FIG. 2 illustrates an exemplary client, in accordance with an embodiment.

FIG. 2 illustrates an exemplary client 202, in accordance with an embodiment. By way of non-limiting example, client 202 is configured to receive requests to encrypt data for sending to a server (e.g., server 104 of FIG. 1) through a command line interface 216. One skilled in the relevant arts will recognize however that other input mechanisms may be used and are contemplated within the scope of this disclosure. Client 202 is able to execute commands received through interface 216 against an encryption and decryption library 218, in accordance with an embodiment. As shown in connection 220, client 202 is able to use library 218 to execute a command to encrypt information for sending to a server. Client 202 may also use library 218 to decrypt results received from the server. In accordance with an embodiment, interface 216 enables restful API commands for sending commands over the web.

When using a homomorphic encryption scheme, client 202 is able to encrypt information before sending to the server, and decrypt the resulting information received from the server, without any of the information being decrypted along the way. By way of non-limiting example, client 202 encrypts information comprising purchase information (e.g., item, quantity, delivery time, price, and additional attributes) for pooling at a server.

In accordance with an embodiment, a single-key implementation may be used where all requesters participating in the pooling process agree upon a common encryption key and common decryption key. In an alternative embodiment, each requester may have an individual encryption key and an individual decryption key, which would require the use of a multi-key homomorphic encryption scheme. In this latter approach, a common decryption key is created from the individual keys in order to decrypt the homomorphic result, in accordance with an embodiment.

Figure 3:
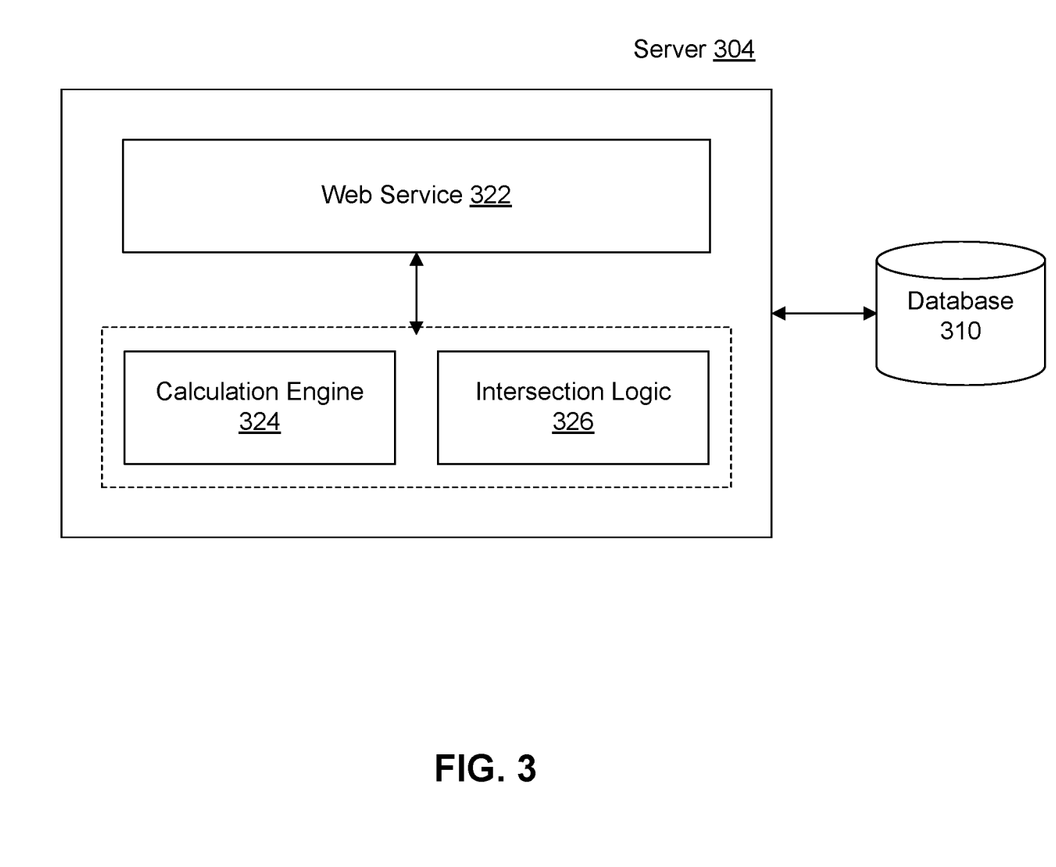
FIG. 3 illustrates an exemplary server, in accordance with an embodiment.

FIG. 3 illustrates an exemplary server 304, in accordance with an embodiment. Server 304 operates a service to receive requests, such as web service 322, as well as one or more modules for performing the pooling operation, in accordance with an embodiment.

Server 304 is also coupled to database 310 to store encrypted information received from a client (e.g., client 202 of FIG. 2).

In exemplary server 304, request information, such as purchase information, is pooled by calculation engine 324 and intersection logic 326. One skilled in the relevant arts will appreciate that the operations of calculation engine 324 and intersection logic 326 may be logically organized in multiple ways, and the approach detailed herein is provided by way of non-limiting example.

In a homomorphic encryption scheme context, server 304 can perform two computations without ever needing to decrypt any of the inputs, in accordance with an embodiment. In particular, server 304 can determine intersections across multiple encrypted requests (the inputs). Determining intersections allows server 304 to determine entities in the requests that can be pooled subject to a match of parameters, such as material, vendor, delivery time, and other attributes. Server 304 is also able to compute a new price per item based on the intersection, summed up corresponding individual demands, and publicly available tiering prices.

Server 304 may also respond to a client, such as client 202 of FIG. 2, with the intersecting set of companies and items (material) that could be pooled. Server 304 may respond to the client with the best possible (pooling-based) price per item. Or server 304 may respond to the client with a combination of this information. In accordance with an embodiment, this information may be provided in stages in order to limit the release of information to individual participating requesters until needed for performing the pooled purchase.

Figure 4A:
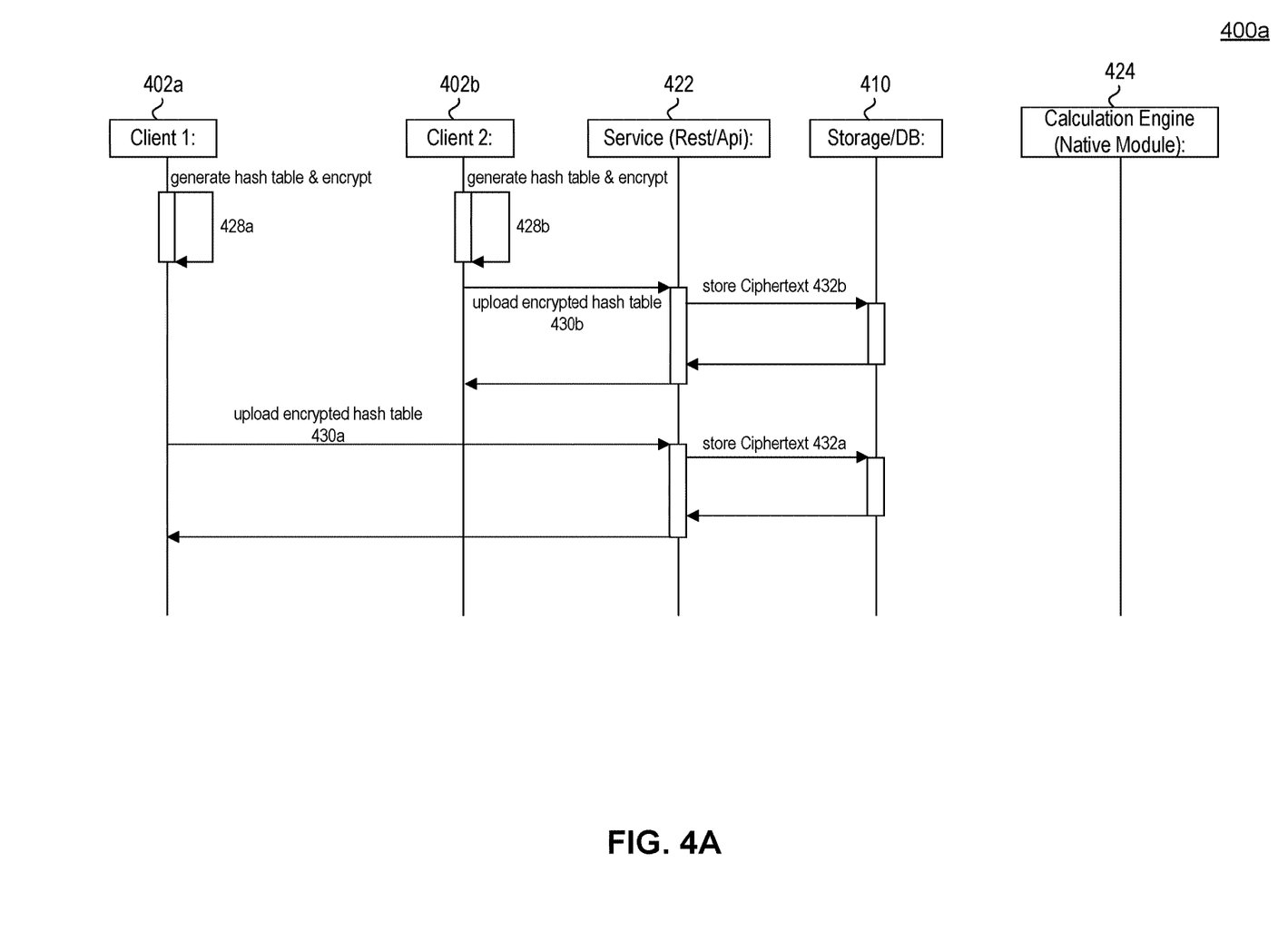
FIGS. 4A and 4B are charts illustrating steps by which pooling is conducted, in accordance with an embodiment.
Figure 4B:
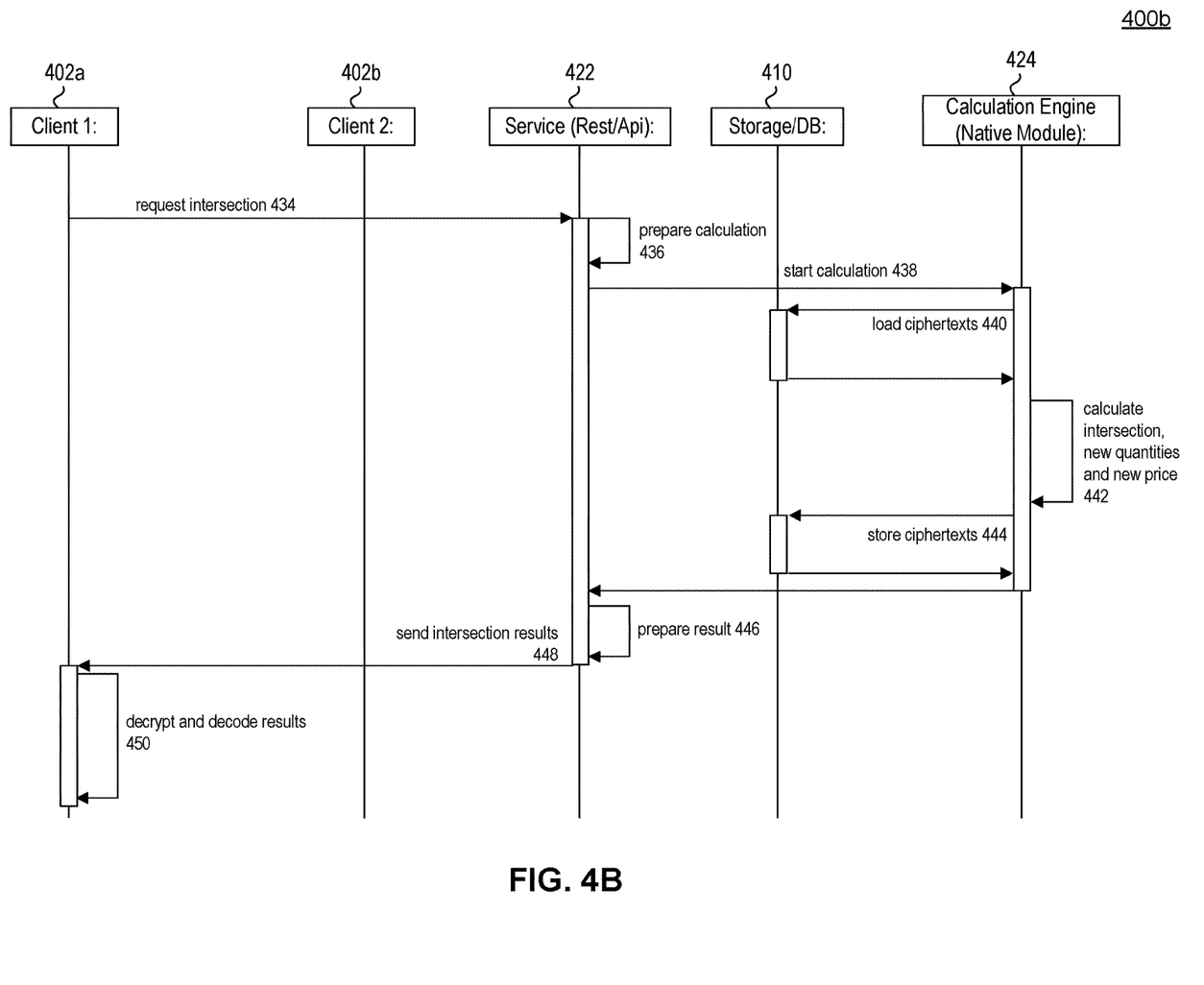

FIGS. 4A and 4B are charts illustrating steps by which pooling is conducted, in accordance with an embodiment. FIG. 4A in particular illustrates a chart 400a showing steps by which a client, such as client 102 of FIG. 1, provides information from a requester (such as a buyer of a particular item), in accordance with an embodiment. In chart 400a, two clients, 402a and 402b, are providing information for a request. By way of non-limiting embodiment, each request details information about an item being requested (e.g., the type of item, a quantity of the item to acquire, attributes of the item, etc.).

At step 428a, client 402a generates a hash table and encrypts the information being provided by a requester. And at step 428b, client 402b likewise generates a hash table and encrypts the information being provided by a respective requester. One skilled in the relevant arts will appreciate that this information could be provided contemporaneously as shown, or across different times.

At steps 430a and 430b, the respective clients each upload their respective encrypted hash table to a server, such as server 104 of FIG. 1. In accordance with an embodiment, these encrypted hash tables are received by a service 422, an exemplary embodiment of which has been discussed in the context of web service 322 in FIG. 3. And at steps 432a and 432b, this service 422 is configured to store the ciphertext of the encrypted hash tables for later use. Storage of the ciphertext is shown as taking place at storage 410, which, in accordance with a non-limiting example, corresponds to database 310 of FIG. 3 or 110 of FIG. 1.

With several pieces of request information stored and ready for pooling based on the process of chart 400a of FIG. 4A, it is now possible to request pooled information, such as pooled pricing.

FIG. 4B illustrates a chart 400b illustrating steps by which pooled information, such as pooled pricing may be requested, in accordance with an embodiment. At step 434, a client 402a requests intersection information from service 422 (e.g., web service 322 of FIG. 3), in accordance with an embodiment. As previously described, and as described in further detail below, determining intersections allows a server to determine entities in the various requests (e.g., the encrypted hash tables uploaded at step 430a and 430b of FIG. 4A) that can be pooled subject to a match of parameters, such as material, vendor, delivery time, and other attributes.

At step 436, service 422 prepares for calculation, in accordance with an embodiment. This can include, by way of non-limiting example, configuring calculation engine 424 for execution. At step 438, service 422 sends a request to calculation engine 424 to begin calculating the intersection. Calculation engine 424 is the calculation 324 in accordance with an embodiment, and is configured to perform and/or call on intersection logic 326 in order to compute the intersection, although one skilled in the relevant art will appreciate that other architectural arrangements may be used.

At step 440, calculation engine 424 retrieves the ciphertexts stored in storage 410. In accordance with an embodiment, these ciphertexts correspond to the ciphertexts stored at steps 432a and 432b of FIG. 4A.

At step 442, the calculation engine 424 calculates the intersection, new quantities, and a new price (or some subset of these items), as a result, in accordance with an embodiment. The ciphertexts are stored in storage 410 at step 444, in accordance with an embodiment.

At step 446, the result is sent to service 422 for preparation and transmission at step 448 to the requesting client 402a. In accordance with an embodiment, preparing the result at step 446 includes collecting results and organizing the results into a results object. And in accordance with an embodiment, transmission at step 448 includes responding to the client's 402a initial request for intersection 434 by sending the results object. At step 450, client 402a decrypts and decodes the result.

What follows is a specific implementation of intersection logic, such as would be performed by intersection logic 326 of FIG. 3, and performed at step 442 of FIG. 4B, in accordance with an embodiment. One skilled in the relevant arts will appreciate, however, that other approaches to calculating the intersection that are built on homomorphic encryption schemes may be used.

A hash function is given as: $h(\cdot)$ with $m=|dom(h(\cdot))|$. A protocol for n clients $C_1, \ldots, C_n$ (e.g., client 102 of FIG. 1) communicating with a single service S (e.g., server 104 of FIG. 1) is given in the following. In accordance with an embodiment, each client has an input set $I_j=\{ \ldots, (x_{j_i}, q_{j_i}), \ldots \}$, consisting of pairs of an item ID $x_{j_i}$ and a quantity $q_{j_i}$, as well as a random dummy ID $d_j \in dom(h(\cdot))$. Client $C_t$ requests the intersection in this example, as in the request 434 of FIG. 4B made by client 402a.

$$C_j: \vec{P}_j = (p_{j_1} \ldots p_{j_k} \ldots p_{j_m}) \text{ s.t.} \qquad 1.$$

$$p_{j_k} = \begin{cases} (x_{j_i}, q_{j_i}) \in I_j & \text{if } k = h(x_{j_i}) \\ (d_j, 0) & \text{otherwise} \end{cases}$$

[Referring to Eq. 1] In this first step, a vector of m pairs containing each pair $(x_{j_i}, q_{j_i}) \in I_j$ at position $h(x_{j_i})$. At the remaining positions for which no ID-quantity pair in $I_j$ exists, add a dummy pair $(d_j, 0)$ that does not affect the intersection computation. The result is a vector of m ID-quantity pairs.

$$C_j \rightarrow S: \vec{X}_j = (E(x_{j_1}) \ldots E(x_{j_k}) \ldots E(x_{j_m})) \qquad 2.$$

[Referring to Eq. 2] In the next step, a vector containing the encrypted IDs given in $\vec{P}_j$ is computed such that the order of IDs in $\vec{X}_j$ is similar to the order of IDs in $\vec{P}_j$).

$$\vec{Q}_j = (E(q_{j_1}) \ldots E(q_{j_k}) \ldots E(q_{j_m})) \qquad 3.$$

[Referring to Eq. 3] Next, a vector containing the encrypted quantities given in $\vec{P}_j$ is computed such that the order of quantities in $\vec{X}_j$ is similar to the order of quantities in $\vec{P}_j$. The vectors $\vec{X}_j$ and $\vec{Q}_j$ are sent to the service S.

$$S: X_{n \times m} = \begin{pmatrix} E(x_{1_1}) & \ldots & E(x_{1_k}) & \ldots & E(x_{1_m}) \\ \vdots & & \vdots & & \vdots \\ E(x_{j_1}) & \ldots & E(x_{j_k}) & \ldots & E(x_{j_m}) \\ \vdots & & \vdots & & \vdots \\ E(x_{n_1}) & \ldots & E(x_{n_k}) & \ldots & E(x_{n_m}) \end{pmatrix} \qquad 4.$$

[Referring to Eq. 4] The clients' vectors $\vec{X}_j$ of encrypted IDs is combined into an n×m matrix X of encrypted IDs such that client $C_j$'s vector $\vec{X}_j$ forms the j-th row of the matrix X.

$$Q_{n \times m} = \begin{pmatrix} E(q_{1_1}) & \ldots & E(q_{1_k}) & \ldots & E(q_{1_m}) \\ \vdots & & \vdots & & \vdots \\ E(q_{j_1}) & \ldots & E(q_{j_k}) & \ldots & E(q_{j_m}) \\ \vdots & & \vdots & & \vdots \\ E(q_{n_1}) & \ldots & E(q_{n_k}) & \ldots & E(q_{n_m}) \end{pmatrix} \qquad 5.$$

[Referring to Eq. 5] The clients' vectors $\vec{Q}_j$ of encrypted quantities is also combined into an n×m matrix $\mathcal{Q}$ of encrypted quantities such that client $C_j$'s vector $\vec{Q}_j$ forms the j-th row of the matrix $\mathcal{Q}$.

$$S \to C_j : \vec{R}_x = (r_{x_1} \ldots r_{x_k} \ldots r_{x_m}) \text{ s.t.} \qquad 6.$$
$$r_{x_k} = \bigvee_{j=1}^{n} (E(x_{i_k}) \odot E(x_{j_k}))$$

[Referring to Eq. 6] Then, a vector of the m ID intersections $r_{x_k}$ of client $C_t$'s IDs and the other n−1 clients' IDs is calculated and sent. For each intersection $r_{x_k}$, the logical XNOR is computed, as denoted by "$\odot$", of $C_t$'s encrypted ID $E(x_{j_k})$. The k-th ID intersection is the logical OR, denoted by "$\vee$", of the n XNOR results. The resulting vector $\vec{R}_x$ contains the item IDs $x_{t_i}$ of the elements that $C_t$ and at least one further client have a quantity $q_{t_i} > 0$. The logical operations are computed bitwise, in accordance with an embodiment.

$$\vec{R}_q = (r_{q_1} \ldots r_{q_k} \ldots r_{q_m}) \text{ s.t.} \qquad 7.$$
$$r_{q_k} = \bigvee_{j=1}^{n} ((E(x_{i_k}) \odot E(x_{j_k})) \wedge E(q_{j_k}))$$

[Referring to Eq. 7] Finally, a vector of the m quantity intersections $r_{q_k}$ of client $C_t$'s quantities and the other n−1 clients' quantities is calculated and sent. For each quantity intersection $r_{q_k}$, the logical XNOR is computed, as denoted by "$\odot$", of $C_t$'s encrypted quantity $E(q_{t_k})$ and the remaining encrypted quantities $E(q_{j_k})$. Then the logical AND, denoted by "$\wedge$", is computed of the XNOR result and the encrypted quantity $E(q_{j_k})$. The k-th quantity intersection is the sum of the n AND results. The resulting vector $\vec{R}_q$ contains accumulated quantities $q_{j_k}$ of the elements that $C_t$ and at least one further client have a quantity $q_{t_i} > 0$. In accordance with an embodiment, the logical operations are computed bitwise.

Figure 5:
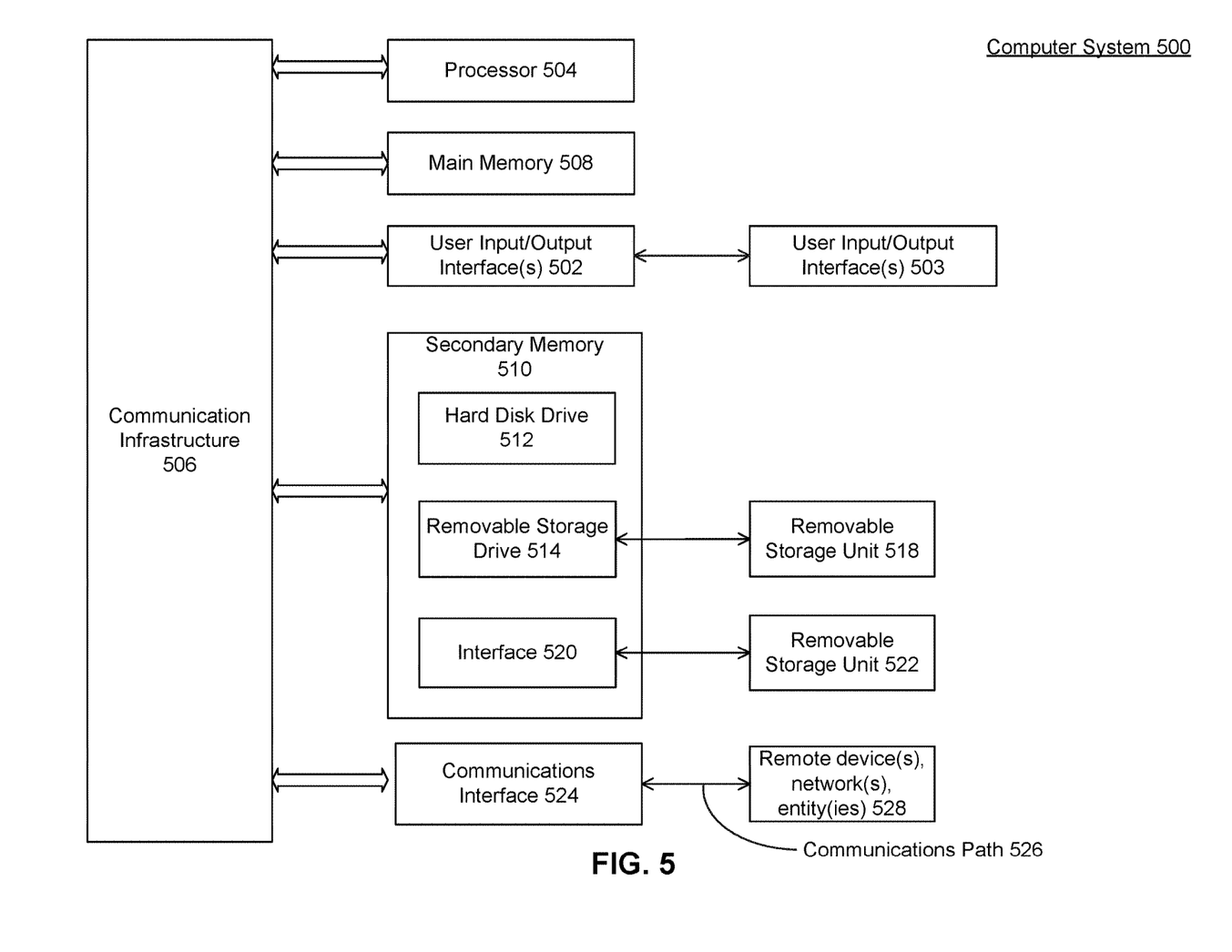
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:

receiving, by one or more processors, first encrypted information comprising a first request from a first client, wherein the first request includes a first encrypted hash table comprising a first quantity of a requested item for purchase by the first client from a merchant;

receiving, by the one or more processors, second encrypted information comprising a second request from a second client, wherein the second request includes a second encrypted hash table comprising a second quantity of the requested item for purchase by the second client from the merchant;

determining a first price for the first quantity of the requested item and a second price for the second quantity of the requested item;

identifying, prior to a purchasing of either the first quantity of the requested item by the first client or the second quantity of the requested item by the second client from the merchant, an intersection of the first encrypted information corresponding to the first quantity of the requested item and the second encrypted information corresponding to the second quantity of the requested item, the intersection indicating that the first request and the second request are combinable into a single order from the merchant at a lower price than both the first price and the second price, wherein both the first request and the second request remain encrypted, wherein the identifying the intersection comprises:

retrieving ciphertexts from both the first encrypted hash table and the second encrypted hash table, wherein the first encrypted hash table is encrypted with a first encryption key that is different from a second encryption key used to encrypt the second hash table;

performing one or more operations on top of the ciphertexts to generate a corresponding operation to be performed on underlying plaintext information, wherein the ciphertexts remain encrypted throughout the performing; and identifying the intersection of a material, delivery time, and the merchant based on the performing;

determining a new price for the single order based on the intersection, the new price being for both the first quantity of the requested item for the first client and the second quantity of the requested item for the second client, wherein the new price is less than both the first price and the second price; and providing a result comprising the new price to at least one of the first client or the second client.

2. The method of claim 1, wherein the first encrypted information and the second encrypted information are encrypted in accordance with a homomorphic encryption scheme.

3. The method of claim 1, further comprising:
retrieving, by the one or more processors, the first encrypted information and the second encrypted information from storage responsive to receiving a request for the intersection.

4. The method of claim 1, wherein determining the new price comprises calculating the new price.

5. The method of claim 1, wherein the providing comprises providing the new price in encrypted form such that the new price is decryptable by the first client.

6. The method of claim 1, wherein receiving the first encrypted information and receiving the second encrypted information are performed through a restful API function.

7. The method of claim 1, wherein both the first encrypted information and the second encrypted information are encrypted using a multi-key homomorphic encryption scheme.

8. The method of claim 1, wherein the single order is for manufactured physical goods.

9. The method of claim 1, wherein the first encrypted information preserves confidentiality of both the first request and the first client with regard to the second client.

10. The method of claim 1, wherein the first encrypted hash table includes the item, the first quantity, the delivery time, one or more price constraints, the merchant, and one or more additional attributes corresponding to the first request.

11. A system, comprising:
a memory configured to store operations; and
one or more processors configured to perform the operations, the operations comprising:
receiving first encrypted information comprising a first request from a first client, wherein the first request includes a first encrypted hash table comprising a first quantity of a requested item for purchase by the first client from a merchant;
receiving second encrypted information comprising a second request from a second client, wherein the second request includes a second encrypted hash table comprising a second quantity of the requested item for purchase by the second client from the merchant;
determining a first price for the first quantity of the requested item and a second price for the second quantity of the requested item;
identifying, prior to a purchasing of either the first quantity of the requested item by the first client or the second quantity of the requested item by the second client from the merchant, an intersection of the first encrypted information corresponding to the first quantity of the requested item and the second encrypted information corresponding to the second quantity of the requested item, the intersection indicating that the first request and the second request are combinable into a single order from the merchant at a lower price than both the first price and the second price, wherein both the first request and the second request remain encrypted, wherein the identifying the intersection comprises:
retrieving ciphertexts from both the first encrypted hash table and the second encrypted hash table, wherein the first encrypted hash table is encrypted with a first encryption key that is different from a second encryption key used to encrypt the second hash table;
performing one or more operations on top of the ciphertexts to generate a corresponding operation to be performed on underlying plaintext information, wherein the ciphertexts remain encrypted throughout the performing; and
identifying the intersection of a material, delivery time, and the merchant based on the performing;
determining a new price for the single order based on the intersection, the new price being for both the first quantity of the requested item for the first client and the second quantity of the requested item for the second client, wherein the new price is less than both the first price and the second price; and
providing a result comprising the new price to at least one of the first client or the second client.

12. The system of claim 11, wherein the first encrypted information and the second encrypted information are encrypted in accordance with a homomorphic encryption scheme.

13. The system of claim 11, the operations further comprising:
retrieving the first encrypted information and the second encrypted information from storage responsive to receiving a request for the intersection.

14. The system of claim 11, wherein the providing comprises providing the new price in encrypted form such that the new price is decryptable by the first client.

15. A non-transitory computer readable storage device having instructions stored thereon, execution of which, by one or more processing devices, causes the one or more processing devices to perform operations comprising:
receiving first encrypted information comprising a first request from a first client, wherein the first request includes a first encrypted hash table comprising a first quantity of a requested item for purchase by the first client from a merchant;
receiving second encrypted information comprising a second request from a second client, wherein the second request includes a second encrypted hash table comprising second quantity of the requested item for purchase by the second client from the merchant;
determining a first price for the first quantity of the requested item and a second price for the second quantity of the requested item;
identifying, prior to a purchasing of either the first quantity of the requested item by the first client or the second quantity of the requested item by the second client from the merchant, an intersection of the first encrypted information corresponding to the first quantity of the requested item and the second encrypted information corresponding to the second quantity of the requested item, the intersection indicating that the first request and the second request are combinable into a single order from the merchant at a lower price than both the first price and the second price, wherein both the first request and the second request remain encrypted, wherein the identifying the intersection comprises:
retrieving ciphertexts from both the first encrypted hash table and the second encrypted hash table, wherein the first encrypted hash table is encrypted with a first encryption key that is different from a second encryption key used to encrypt the second hash table;
performing one or more operations on top of the ciphertexts to generate a corresponding operation to be performed on underlying plaintext information, wherein the ciphertexts remain encrypted throughout the performing; and identifying the intersection of a material, delivery time, and the merchant based on the performing;

determining a new price for the single order based on the intersection, the new price being for both the first quantity of the requested item for the first client and the second quantity of the requested item for the second client, wherein the new price is less than both the first price and the second price; and providing a result comprising the new price to at least one of the first client or the second client.

16. The non-transitory computer readable storage device of claim 15, wherein the first encrypted information and the second encrypted information are encrypted in accordance with a homomorphic encryption scheme.

17. The non-transitory computer readable storage device of claim 15, the operations further comprising:

retrieving the first encrypted information and the second encrypted information from storage responsive to receiving a request for the intersection.

18. The non-transitory computer readable storage device of claim 15, wherein determining the new price comprises requesting the new price from the merchant.

\* \* \* \* \*